(12) United States Patent
Zantinge

(10) Patent No.: US 6,482,458 B2
(45) Date of Patent: Nov. 19, 2002

(54) METHOD FOR PREPARING A CHEESE HAVING A CLOSED RIND AND A VIRTUALLY BLIND STRUCTURE

(75) Inventor: Jan Zantinge, Drachten (NL)

(73) Assignee: Tetra Laval Holdings & Finance S.A., Pully (NL)

( * ) Notice: Subject to any disclaimer, the term of this patent is extended or adjusted under 35 U.S.C. 154(b) by 114 days.

(21) Appl. No.: 09/733,930

(22) Filed: Dec. 12, 2000

(65) Prior Publication Data

US 2001/0041204 A1 Nov. 15, 2001

(30) Foreign Application Priority Data

Dec. 14, 1999 (NL) .............................. 1013843

(51) Int. Cl.⁷ .............................................. A23C 19/00
(52) U.S. Cl. ........................ 426/512; 426/486; 426/582
(58) Field of Search ................................ 426/512, 582, 426/482; 99/458

(56) References Cited

U.S. PATENT DOCUMENTS

| | | | |
|---|---|---|---|
| 4,234,615 A | | 11/1980 | Krueger |
| 4,811,658 A | * | 3/1989 | Brandsema et al. .......... 99/458 |
| 5,082,681 A | | 1/1992 | Barlow et al. |

FOREIGN PATENT DOCUMENTS

| | | |
|---|---|---|
| EP | 0 069 282 | 1/1983 |
| EP | 0 742 998 | 11/1996 |

OTHER PUBLICATIONS

Eliseev et al., "Effect of vacuum treatment on structure formation of cheeses put into moulds by filling or pouring", *Vsesoyuzny Nauchno–issledovatel'skii Institut Maslodel'noi i Syrodel'noi Promyshlennosti,* No. 23, 65–69, 146 (1978). (English abstract only).

J. Czulak, "Simpler Approach to Cheddaring" *Dairy Engineering,* pp. 183–186 (Jul. 1962.

Reinhold et al., "Pressure and Temperature During Vacuum Treatment of 290–Kilogram Stirred–Cured Cheddar Cheese Blocks", *Journal of Dairy Science,* vol. 76, No. 4, 909–913 (1993).

Robertson et al., "The Influence of Pressing on the Composition and Quality of Gouda Cheese", *South African Journal of Dairy Technology,* vol. 5, No. 1, 17–22 (1973).

* cited by examiner

*Primary Examiner*—George C. Yeung
(74) *Attorney, Agent, or Firm*—Pennie & Edmonds LLP

(57) ABSTRACT

A method for preparing a cheese having a closed rind, wherein fresh granular curd is subjected to a pressing treatment in a cheese pressing mold until a rind forms and the desired moisture content in the cheese has been achieved. Prior to the traditional pressing, the curd is first pre-drained, whereafter the pre-drained curd parts are poured into a cheese pressing mold. Then the curd parts are subjected during a short initial pressing procedure to obtain a blind structure of the cheese in the cheese pressing mold to a vacuum treatment with a substantially constant vacuum depth in the order of approximately 95% or more.

20 Claims, 1 Drawing Sheet

Figure 1:
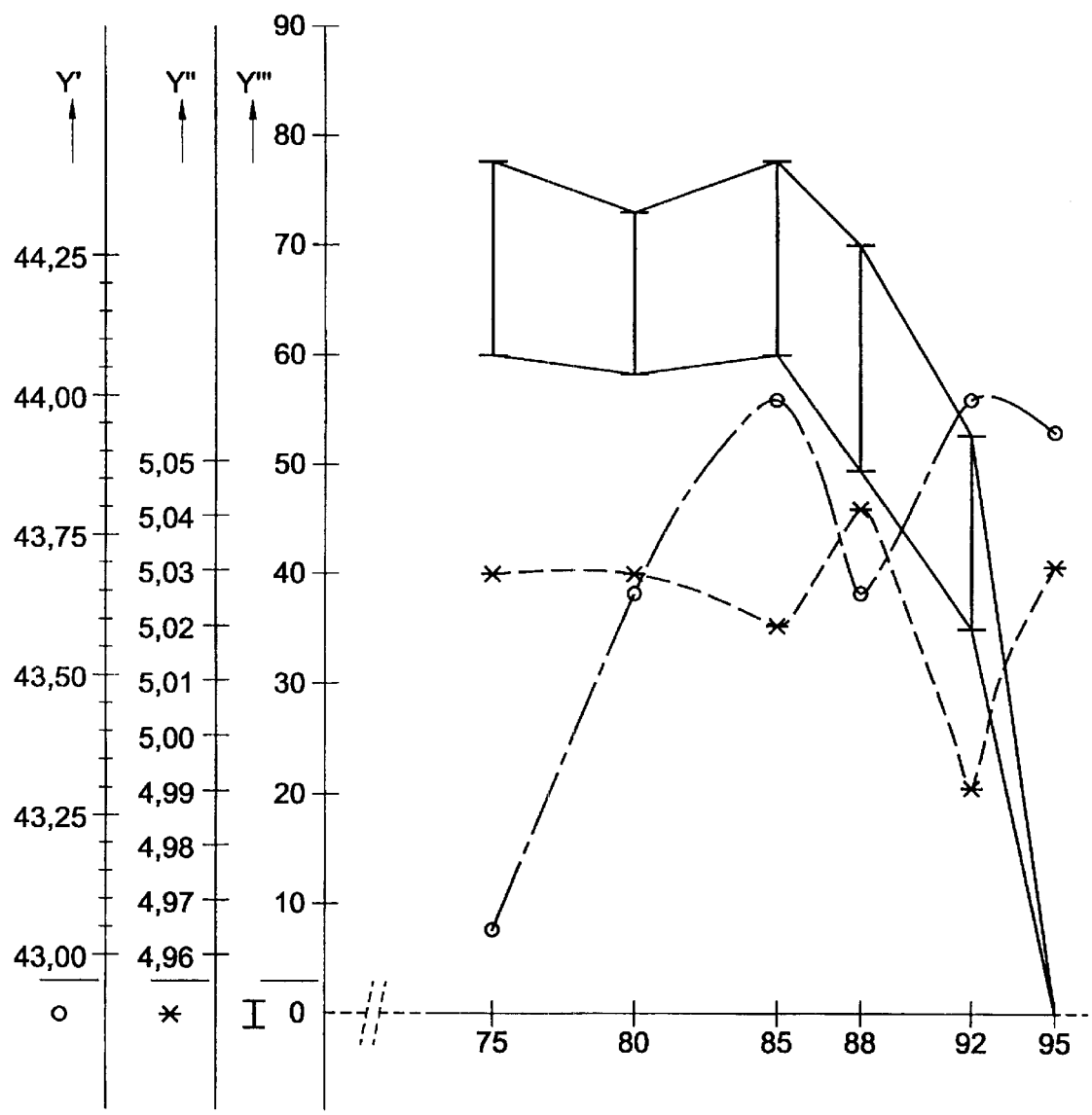

METHOD FOR PREPARING A CHEESE HAVING A CLOSED RIND AND A VIRTUALLY BLIND STRUCTURE

BACKGROUND OF THE INVENTION

This invention relates to a method for preparing a cheese having a closed rind, wherein fresh granular curd after separation from the whey is directly or after a short time subjected to a pressing treatment in a cheese pressing mold until a rind forms and the desired moisture content in the cheese has been achieved.

After the desired acidity has been achieved in the cheese through the action of microorganisms, the cheeses are salted in a brine bath and subsequently ripened.

In the assessment of the quality of the structure of the eventual cheese of the closed-rind type such as Gouda or Edam, the appearance of the section of the cheese at an age of approximately 2 weeks is of essential importance.

This section should be virtually blind, that is, there should not be any irregular holes present. What is allowed, on the other hand, is the occurrence of round, smooth "eyes" due to the gas formation of microorganisms during the ripening of the cheese.

Heretofore, it was not possible to produce a cheese without irregular holes from a granular curd. By exposing curd to the air, air adheres to the curd parts. This adsorbed air cannot be removed during a conventional pressing procedure and remains visible in the eventual cheese as holes.

SUMMARY OF THE INVENTION

The invention contemplates offering a solution to the problem outlined. To that end, according to the invention, the fresh pre-drained curd parts are poured into a cheese pressing mold, whereafter the curd parts, prior to the pressing treatment, are subjected during a short initial pressing procedure to obtain a blind structure of the cheese in the cheese pressing mold to a vacuum treatment with a substantially constant vacuum depth in the order of approximately 95% or more.

It has been found that the vacuum depth is a critical factor in obtaining the closed structure. At a vacuum depth of approximately 95% (72.5 mm Hg abs.) or more, a closed structure, that is, a structure without or virtually without irregular holes is obtained.

DETAILED DESCRIPTION OF THE PREFERRED EMBODIMENTS

It is noted that from an article by J. Czulak, entitled: "Simpler Approach to Cheddaring", published in Dairy Engineering, June 1962, pp. 183–186, a method is known in which curd is simultaneously exposed to a vacuum and a mechanical pressure. However, this concerns cheese types belonging to the Cheddar group.

In the method, the curd is first "cheddared", which is a procedure whereby the curd is acidified, as a result of which the structure changes. The curd parts fuse with each other and a fibrous structure is formed. The curd bed thus formed is cut into pieces and subsequently salted, mostly with dry salt.

The salted curd fragments obtained are filled into a pressing mold. These molds can be subjected to a vacuum treatment, whereby the air is extracted from between the curd fragments.

In this known method, a vacuum depth is used which does not go beyond about 25 inch Hg, which corresponds to about 80% vacuum. During the vacuum treatment, the cheeses are pressed for a number of hours; optionally, vacuum pressing may be followed by a normal pressing step.

Further, from U.S. Pat. No. 5,082,681 a method is known for forming cheese blocks from prepared curd using a perforated column, which cheese blocks are subsequently compressed in a cheese pressing mold under sub-atmospheric pressure. The prepared curd is obtained by draining fresh curd of whey to obtain a dry curd. The dry curd is salted, undergoes a cheddaring treatment, stirring treatment, mixing treatment or the like to obtain a prepared curd, which is subsequently fed into a vertical perforated column, a so-called block former. In the column, the curd is compressed under its own weight, while air and whey are removed from the column. At the lower end of the column, a guillotine blade is present, by means of which, at intervals, the lower part of the pillar of curd is cut off for forming a cheese block. The cheese blocks thus obtained are subsequently introduced into a pressing mold under a high vacuum, the gas pressure being in the range from −0.9 to −1.0 bar. Then the cheese blocks are pressed for 45 to 120 seconds at a high pressure of 4 bar or more to rapidly obtain a rind. During pressing, the gas pressure rises to the atmospheric pressure. The purpose of the briefly applied vacuum is to create a rind in order to obtain a transportable block.

From EP-A-0 069 282, a method is known for preparing e.g. Cheddar cheese, in which a deep vacuum is applied for carrying out a flash cooling technique. During the vacuum, no pressing is carried out.

The invention, by contrast, relates to the preparation of semi-hard cheese types, in which the curd is not cheddared and salted, but the fresh curd parts are separated from the whey and the obtained curd parts are directly, or after a short time, along with some moisture clinging thereto, poured into a cheese pressing mold. For a short time, in the order of 30 minutes or shorter, the filled mold is subsequently held under a deep vacuum, in the order of approximately 95% or deeper. At a less deep vacuum, the cheese does not obtain the desired blind structure. During the vacuum period, or a part thereof, mechanical pressure is applied, which may or may not be done in different steps with different mechanical pressures.

The loose curd parts can be charged into a pressing mold by weight or by volume. After the vacuum pressing procedure, the cheeses are further treated in the traditional manner.

Depending on cheese size, pressing (end pressing) is then done for 15 to 90 minutes, Thereupon, if the acidity has not attained the desired degree yet, the cheeses can rest for a particular time before being salted in a brine bath. After the brining time, the cheeses, depending on the type of cheese, can be packaged in film or ripen naturally in a store, optionally in combination with a surface treatment of the rind.

It is noted that in the article entitled "The Influence of Pressing on the Composition and Quality of Gouda Cheese" by N. H. Robertson et al., South African Journal of Dairy Technology (1973) Vol 5, No. 1, an experiment is described with regard to the manner of pressing Gouda cheese and the influence thereof on the composition and texture of the eventual cheese. In two experiments, pressing under a low vacuum of 50 cm Hg was employed. Any relation with the presence or absence of holes in the section is not mentioned.

Further, in an article entitled "Effect of vacuum treatment on structure formation of cheeses put into moulds by filling or pouring" by O. M. Eliseev et al. in Trudy, Vsesoyuznyi Nauchno-issledovatel'skii Institut Maslodel'noi i Syrodel'noi Promyshlennosti, (1978), No. 23, 65–69, 146, an experiment is described in which Dutch-type cheese was exposed to vacuum. It was found that a vacuum treatment prior to pressing has a positive effect on the closure of the surface of the cheese, and leads to a greater hardness and viscosity of the cheese, as well as to a greater firmness of the rind. With regard to the formation of eyes in the cheese, no influence of the vacuum treatment was observed.

EXAMPLE

Six series of two Edam cheeses were prepared, with the following data regarding the process being of importance.
filling weight of the pre-drained curd parts in the pressing molds between 2,300 and 2,400 g.
weight losses during the process:
vacuum and pressing loss: 22–25%
weight loss during brining: 1.5–2.5%
weight loss during storage: 2% (ripened naturally)
Vacuum treatment;
  Pressureless: 5 min (inci. vacuum drawing)
  Pressing: max. 10 min in 2 pressure phases, for instance 5 minutes at a low pressure up to approximately 100 g/cm$^2$ and 5 minutes at a medium pressure up to approximately 200 g/cm$^2$
End pressing: 45 min. in 2 pressure steps
Brining
Storage, rind treatment with coating
Ripening During the vacuum treatment, the 2×6 cheeses were exposed, at constant times and mechanical pressures, to different values of vacuum pressure. To assess the structure of the section of the cheeses formed, a choice had been made for a comparison of the number of holes per 25 cm$^2$ of the cheese surface.

Further, the moisture content and the pH of the cheeses were determined.

In the appended graph, the vacuum depth in % is plotted along the X-axis, while plotted along the Y-axis are: the moisture content (Y'), the pH (y") and the number of holes per 25 cm$^2$ (y'"), The latter parameter was determined per cheese in quadruplicate and the variation is indicated in the graph.

The measurements were carried out at the prevailing ambient temperature of 16–25° C., a cheese temperature of 30–34° C. and a relative humidity of 75–95%.

The experiments showed that the moisture content of the cheese at an age of 14 days was reasonably constant and was 43.05–44.00% over the six cheeses. The pH of the cheeses was between 4.99 and 5.04. These values are or the low side; it is not clear what the cause of this is.

The determination of the number of holes was carried out in a grid of 10×2.5 cm, four times per cheese.

The differences between the four counts per cheese are reflected in the length of the vertical line sections in the graph. The graph now shows that up to a vacuum pressure of 92%, the cheeses are unacceptable due to an excess of undesired holes. At a vacuum pressure of 95%, the cheeses were found to be blind, that is, the number of holes was 0–1 per 25 cm$^2$.

It is noted that the specified values for the vacuum pressure are based on conditions at sea level and a temperature in the range of approximately 10 to approximately 40° C. If conditions are different, the vacuums depth is to be corrected according to current physical calculations.

It is further noted that after the foregoing, various modifications will readily occur to one skilled in the art. Thus, for instance, the vacuum may already be applied prior to pressing or may not be applied until during pressing. In the first case, the vacuum already prevails for a particular period, while in that period no mechanical pressure is applied yet. Also, vacuum pressing can, if desired, take place in a receptacle other than the receptacle used for the conventional pressing treatment. These and similar modifications are understood to fall within the scope of the invention.

What is claimed is:

1. A method for preparing a cheese having a closed rind, comprising separating curd from whey;

introducing the curd into a cheese pressing mold;

pressing the curd during an initial pressing procedure while applying to the curd a vacuum that is at least about 95% below atmospheric pressure at sea level and an ambient temperature of 10° C. to 40° C.;

subjecting the curd to a subsequent pressing procedure at least until a rind forms.

2. The method according to claim 1, wherein the initial pressing procedure comprises a plurality of pressure phases, a mechanical pressure in a one pressure phase being higher than a mechanical pressure in a preceding pressure phase.

3. The method according to claim 2, wherein the initial pressing procedure comprises applying, in a first pressure phase, a mechanical pressure up to about 100 g/cm$^2$ and applying, in a second pressure phase, a mechanical pressure up to about 200 g/cm$^2$.

4. The method according to claim 3, wherein the first and second pressure phases each have a duration of about 5 minutes.

5. The method according to claim 1, further comprising applying a vacuum prior to the initial pressing procedure.

6. A method according to claim 5, comprising applying a vacuum for at least about 5 minutes, prior to the initial pressing procedure.

7. The method according to claim 1, further comprising pre-draining the curd before the initial pressing procedure.

8. The method according to claim 1, wherein the initial pressing procedure and the subsequent pressing procedure are performed while the curd is in the same cheese processing mold.

9. The method according to claim 1, wherein the subsequent pressing procedure is performed until a predetermined moisture content in the cheese has also been achieved.

10. The method according to claim 9, wherein the subsequent pressing procedure is performed in a cheese processing mold.

11. The method according to claim 10, wherein the initial pressing procedure and the subsequent pressing procedure are performed while the curd is in the same cheese processing mold.

12. A method for preparing a cheese having a closed rind, comprising the steps of:

separating fresh granular curd from whey;

introducing the curd into a cheese pressing mold;

during an initial pressing procedure in the cheese pressing mold, vacuum treating the curd with a substantially constant vacuum that is at least about 95% below atmospheric pressure at sea level, at an ambient temperature of 10° C. to 40° C.; and subjecting the curd to a subsequent pressing procedure in a cheese pressing mold to form a rind and to achieve a predetermined moisture content in the cheese.

13. A method according to claim 12, wherein the initial pressing procedure comprises more than one pressure phase, the mechanical pressure in each successive pressure phase being higher than in a preceding pressure phase.

14. A method according to claim 13, wherein the initial pressing procedure comprises applying, in a first phase, a mechanical pressure up to about 100 g/cm$^2$ and applying, in a second phase, a mechanical pressure up to about 200 g/cm$^2$.

15. A method according to claim 14, wherein the first and second pressure phases each have a duration of about 5 minutes.

16. A method according to claim 14, wherein the vacuum treatment further comprises applying a vacuum prior to the initial pressing procedure.

17. A method according to claim 16, wherein the vacuum applied prior to the initial pressing procedure has a duration of about 5 minutes.

18. A method according to claim 12, further comprising pre-draining the curd before performing the initial pressing procedure.

19. A method according to claim 12, wherein the initial pressing procedure and the subsequent pressing procedure occur while the curd is in the same cheese mold.

20. In a method for preparing a cheese having a closed rind, said method including separating curd from whey, introducing the curd into a cheese pressing mold and pressing the curd at least until a rind forms, the improvement comprising:
prior to pressing the curd until at least a rind forms, pressing the curd during an initial pressing procedure while applying to the curd a vacuum that is at least about 95% below atmospheric pressure at sea level and an ambient temperature of 10° C. to 40° C.

* * * * *